United States Patent
Bhagat et al.

(10) Patent No.: US 8,832,091 B1
(45) Date of Patent: Sep. 9, 2014

(54) GRAPH-BASED SEMANTIC ANALYSIS OF ITEMS

(71) Applicant: Amazon Technologies, Inc., Reno, NV (US)

(72) Inventors: Rahul H. Bhagat, Bellevue, WA (US); Brian Cameros, Seattle, WA (US); Srikanth Thirumalai, Clyde Hill, WA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/647,296

(22) Filed: Oct. 8, 2012

(51) Int. Cl.
*G06F 7/00* (2006.01)
*G06F 17/30* (2006.01)

(52) U.S. Cl.
USPC .......................................... 707/723

(58) Field of Classification Search
None
See application file for complete search history.

(56) References Cited

U.S. PATENT DOCUMENTS

| | | | |
|---|---|---|---|
| 2007/0185868 A1* | 8/2007 | Roth et al. | 707/6 |
| 2009/0287674 A1* | 11/2009 | Bouillet et al. | 707/5 |
| 2010/0169328 A1* | 7/2010 | Hangartner | 707/751 |
| 2012/0233180 A1* | 9/2012 | Hassan et al. | 707/748 |

* cited by examiner

*Primary Examiner* — Robert Beausoliel, Jr.
*Assistant Examiner* — Nicholas Allen
(74) *Attorney, Agent, or Firm* — Lee & Hayes, PLLC

(57) ABSTRACT

The use of graph-based semantic analysis with respect to items and tags may enable the discovery of the characteristics of items. A tag collection component may initially obtain a corresponding set of tags for each item of multiple items. A graph generation component may then generate a graph that includes a corresponding item node for each item and a corresponding tag node for each tag cluster of tags. Each item node in the graph may be connected to each of one or more tag nodes by a respective edge. Subsequently, following assignment of a label to each tag node, a graph evaluation component may execute a random walk algorithm on the graph. The execution of the random walk algorithm may provide a corresponding ranked list of tags for each item or a corresponding set of correlated tags for each tag.

26 Claims, 9 Drawing Sheets

GRAPH-BASED SEMANTIC ANALYSIS OF ITEMS

BACKGROUND

Online merchant websites may allow users to provide tags for items that are offered for sale. Each tag may be a phrase that is assigned to an item in order to describe an aspect of the item. The aspect may be some content of the item, a use of the item, a feeling invoked by the item, or a thought associated with the item. Accordingly, the tags that are assigned to an item may help the online merchant to classify the item into categories or associate the item with related items. Users may assign tags to the items to share their thoughts, feelings, and understandings, or opinions about the items with an online community.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Overview

Figure 1:
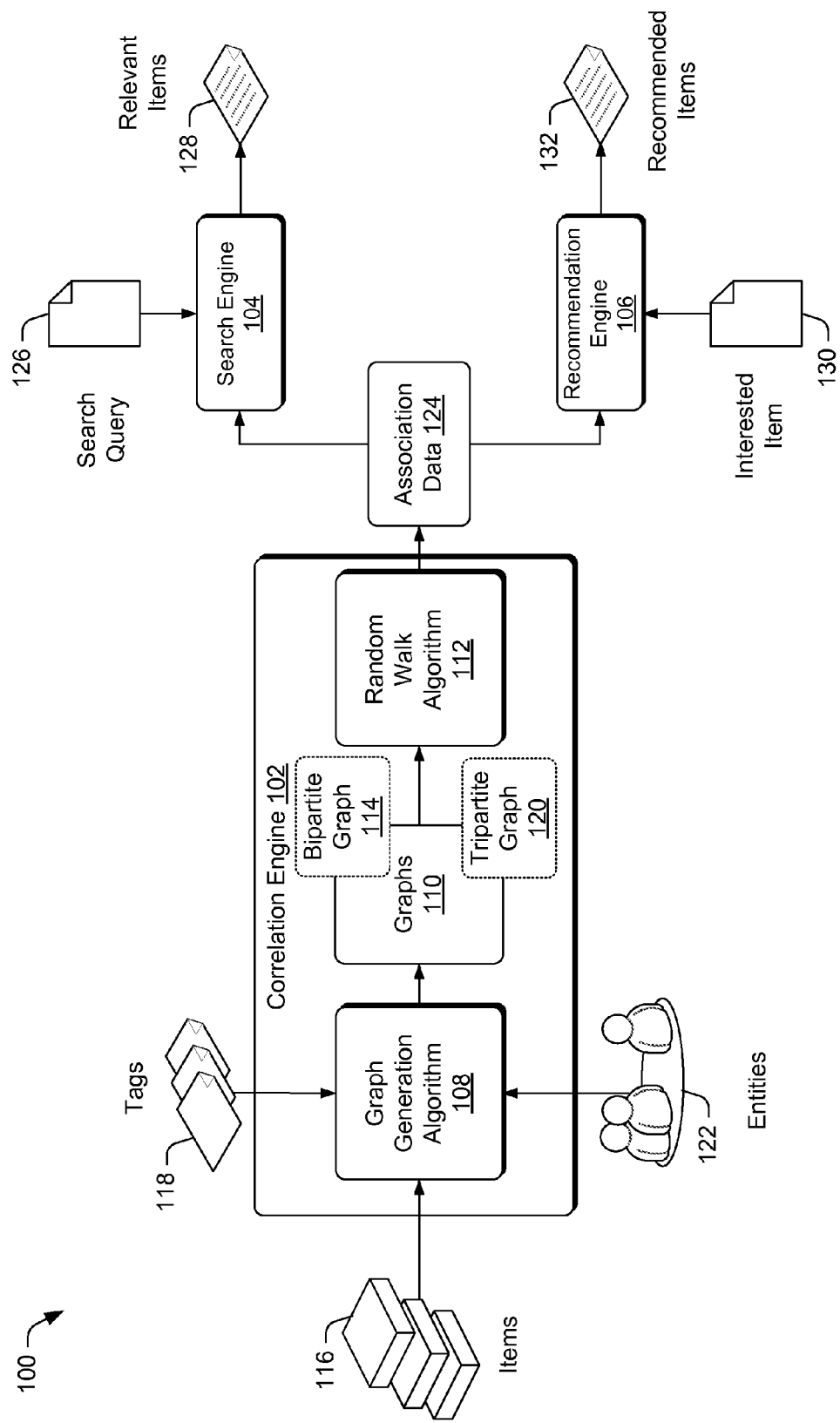
FIG. 1 is a schematic diagram of an illustrative architecture for implementing various embodiments of graph-based semantic analysis of items.

The disclosure is directed to architectures and techniques for using graph-based semantic analysis of tags assigned to items to discover associations between items, associations between tags, and associations between entities that are related to the items. The graph-based semantic analysis may be performed with the use of graphs that include nodes and edges, such as bipartite graphs and tripartite graphs. Each of the items may be an intangible or tangible product, or a bundle of such products, that are offered for sale by a merchant. For example, the item may be a movie that is stored on an optical disc, such as a digital video disc (DVD), or the item may be a downloadable file that includes the movie. In another example, the item may be a book that is printed on paper or an electronic book (e-book) that can be downloaded to an electronic reader device. However, in other embodiments, each of the items may be a service or a bundle of services. Each of the tags may be phrase (e.g., a word or a term) that is assigned to an item in order to describe an aspect of the item. In various embodiments, the tags may be assigned by professional item reviewers or assigned by an online public community of users with interest in the items. For example, an online merchant website may include a web page that invites customers and other web users to assign tags that describe items. An entity that is related to an item may be an entity that contributed to the production of the item, offered the item for sale, purchased the item, or is otherwise involved in some aspect of the creation to use cycle of the item. For example, with respect to an item that is a DVD copy of a movie, the entity that is related to the movie may be a movie director of the movie, an actor that starred in the movie, a company that released the movie, or a customer that purchased the movie.

The graph-based semantic analysis of the tags assigned to the items may provide selective groups of tags that are most descriptive of the characteristics of each item, or the characteristics of each entity that is related to an item. Additionally, the graph-based semantic analysis of the tags with respect to the items may also provide correlations between items, in which the correlations may indicate that the items share similar traits (e.g., two movies that share a similar plot).

The various association data that is generated by the graph-based semantic analysis of the tags may be used to provide search results and item recommendations. For example, when a user inputs a search query for a particular item into a search engine of an online merchant, the search engine may provide an item that matches the search query, as well as one or more items that have similar traits to the matching item. In another example in which an entity is a consumer that purchased an item, the characteristics obtained through the tags for the items may be attributed to the consumer. As such, the characteristics may be used to customize a landing web page of an online merchant for the consumer, such that the landing web page displays items that fit the characteristics of the consumer. For instance, the characteristics may indicate that the consumer is an outdoor enthusiast. Accordingly, the customized landing web page may display outdoor gear and products.

Thus, the use of graph-based semantic analysis with respect to items and their tags may enable the discovery of the characteristics of items, the associations between items, and the characteristics of entities that are associated with the items. Such association data may enable a merchant to customize the distribution of item search results or item recommendations for customers. In this way, customers may benefit by discovering items that are suited to their individual tastes and needs. The merchant may benefit by receiving recurring business from repeat customers or additional business from new customers.

Illustrative System Architecture

FIG. 1 is a schematic diagram of an illustrative architecture 100 for implementing various embodiments of the graph-based semantic analysis of items. The architecture 100 may include a correlation engine 102, a search engine 104, and a recommendation engine 106. The correlation engine 102 may use a graph generation algorithm 108 to generate graphs 110 for analysis by a random walk algorithm 112. In some embodiments, the random walk algorithm may be a label propagation algorithm. The correlation engine 102 may generate a bipartite graph 114 based on the items 116 and the tags 118. The bipartite graph 114 may be a mathematical representation of the relationships between the items 116 and the tags 118. Each of the items 116 may be an intangible or tangible product, or a bundle of such products, that are offered for sale by a merchant. For example, the item may be a movie that is stored on an optical disc, such as a digital video disc (DVD), or the item may be a downloadable file that includes the movie. In another example, the item may be a book that is printed on paper or an electronic book (e-book) that can be downloaded to an electronic reader device. However, in other embodiments, each of the items 116 may be a service or a bundle of services. Further, each of the tags 118 may be a phrase that is assigned to an item in order to describe an aspect of the item.

The bipartite graph 114 that is generated by the graph generation algorithm 108 may include two sets of nodes, in which each of the items 116 is represented by an item node and each of the tags 118 is represented by a tag node. Further, an item node may be connected to a tag node by an edge when a corresponding tag is used to describe a corresponding item. The edge may be a representation of the relationship between the tag node and the corresponding tag. For instance, when a tag that includes a term "awesome action sequences" is used to describe a movie, a corresponding tag node for the tag may be linked to a corresponding item node for the movie by an edge. Accordingly, the bipartite graph 114 may include multiple edges that link the nodes in the two sets. The correlation engine 102 may execute the random walk algorithm 112 on the bipartite graph 114 to discover associations with respect to the items 116 and the tags 118. Generally speaking, the random walk algorithm 112, which may be a label propagation algorithm, is a semi-supervised learning method for finding associations between labeled data based on similarities between unlabeled data.

With respect to each of the items 116, the execution of the random walk algorithm 112 may provide a ranked list of associated tags for each item and a ranked list of items that are associated each item. The list of tags that are associated with each item may contain phrases that are most descriptive of the item. Likewise, the ranked list of items that are associated with each item may be items that have the most similar traits to the item. With respect to each of the tags 118, the execution of the random walk algorithm 112 may provide a list of associated tags for each tag, in which each of the associated tags may have a similar meaning to the tag. For instance, the tag "hero vs. villain" may be associated with the tag "good vs. evil".

Alternatively, the correlation engine 102 may generate a tripartite graph 120 based on the items 116, the tags 118, and an entities 122. Like the bipartite 114, the tripartite graph 120 may be a mathematical representation of the relationships between the items 116, the tags 118, and the entities 122. Each of the entities 122 may be related to one or more of the items 116. An entity that is related to an item may be an entity that contributed to the production of the item, offered the item for sale, purchased the item, or is otherwise involved in some aspect of the creation to use cycle of the item. For example, with respect to an item that is a DVD copy of a movie, the entity that is related to the movie may be a movie director of the movie, an actor that starred in the move, a company that released the movie, or a customer that purchased the movie.

Accordingly, the tripartite graph 120 may include three sets of nodes, with a tag node set, an item node set, and an entity node set. Each of the items 116 may be represented by a corresponding item node in the item node set, and each of the tags 118 may be represented by a corresponding tag node in the tag node set. Likewise, each of the entities 122 may be represented by a corresponding entity node in the entity node set. The three sets of nodes may be connected by edges, in which an edge between an item node and a tag node may indicate that a tag is used to describe an item. Further, an edge between an entity node and an item node may indicate that an entity is related to an item. Accordingly, the tripartite graph 120 may include edges connecting the nodes in the item node set to the nodes in the entity node set, and edges connecting the nodes in the item node set to the nodes in the tag node set.

The correlation engine 102 may execute the random walk algorithm 112 on the tripartite graph 120 to discover associations between the entities 122 and the tags 118. In one instance, the execution of the random walk algorithm 112 may provide a ranked list of associated tags for each of the entities 122. For example, given an entity that is a movie director of an item that is DVD copy of a movie, the correlation engine 102 may associate the tag "action and adventure" with both the movie and the movie director following the execution of the random walk algorithm 112.

Thus, the analysis of the graphs 110 using the random walk algorithm 112 may generate association data 124. The correlation engine 102 may feed the association data 124 to the search engine 104 and the recommendation engine 106. The search engine 104 may use the association data 124 to provide search results to a user. For example, when a user inputs a search query 126 for a particular item into the search engine 104, the search engine 104 may provide an item that matches the search query, as well as one or more relevant items 128 that have similar traits to the matching item. In another example, the search engine 104 may use the association data 124 to provide recommendations of items based on an input phrase. The input phrase may include a tag that is correlated with one or more items. For instance, when the input phrase includes the tag "revenge", the search engine 104 may provide one or more DVD movies with plots that are correlated with the tag "revenge," or correlated with a tag that in turn correlates with the tag "revenge." The recommendation engine 106 may use the association data 124 to generate recommendations as a user indicates interest in one or more displayed items on a web page. For instance, when the user indicates an interest in a particular item 130 that that is shown in a webpage, the recommendation engine 106 may update the web page or another web page to display recommended items 132 that have similar traits to the particular item. The user may indicate the interest in the particular item by viewing the item, purchasing the item, posting a review for the item, providing a tag for the item, rating the item, and/or perform other actions with respect to the item. In another example, the recommendation engine 106 may provide personalized recommendations. For instance, when the association data 124 indicates that the correlation engine 102 has attributed a characteristic of outdoorsman to an entity that is a customer, the recommendation engine 106 may customize a web page that is displayed to the customer to show outdoor gears and products.

Example Server Modules

Figure 2:
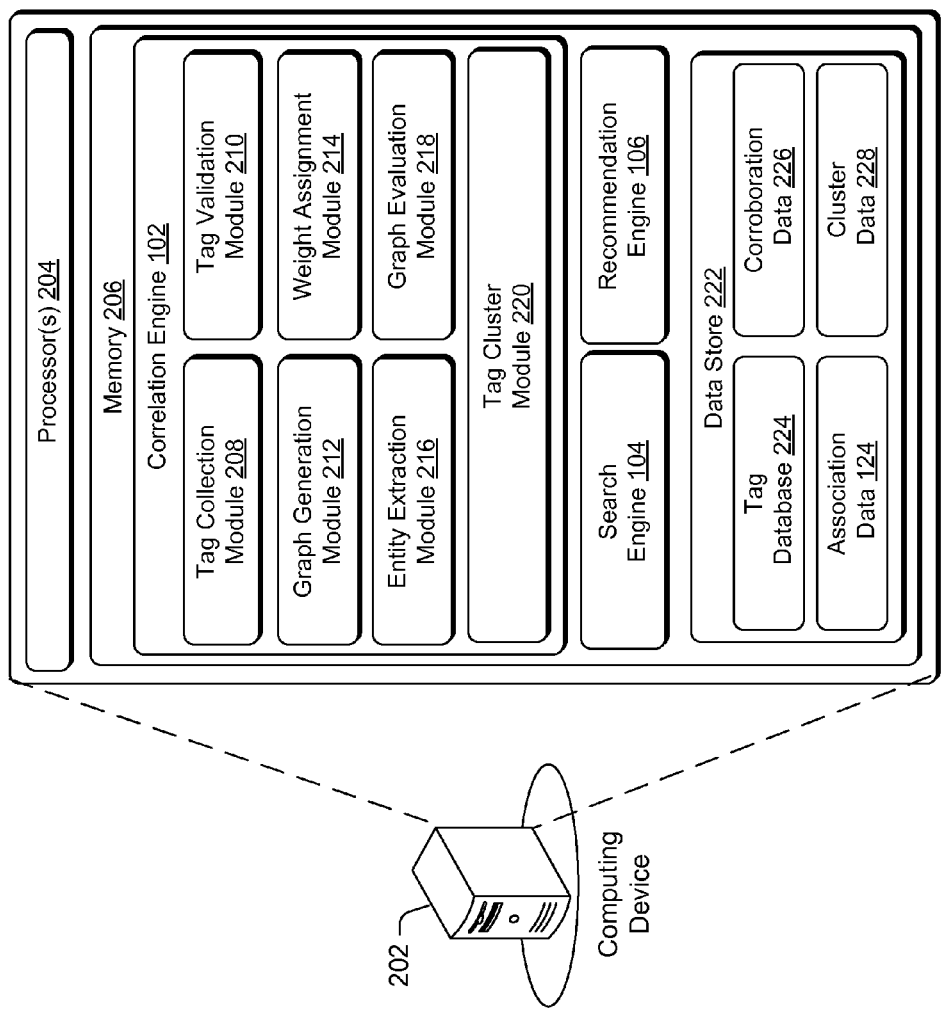
FIG. 2 is a schematic diagram of illustrative components that implement graph-based semantic analysis of items and recommends other items based on the analysis results.

FIG. 2 is a schematic diagram of illustrative components that implement graph-based semantic analysis of items and recommends other items based on the analysis results. The components may include the correlation engine 102, the search engine 104, and the recommendation engine 106. The engines may be executed by one or more computing devices 202. In at least some embodiments, the computing devices 202 may be servers. In other embodiments, each of the computing devices 202 may be a mobile communication device, a smart phone, a portable computer, a tablet computer, a desktop computer, a slate computer, or any other electronic device that is equipped with network communication components to receive and transmit data, data processing components to process data, and user interface components to receive data from and present data to a user.

The computing devices 202 may include processor(s) 204 and memory 206. The memory 206 may include computer readable media. The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some embodiments the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks.

The correlation engine 102 may include a tag collection module 208, a tag validation module 210, a graph generation module 212, a weight assignment module 214, an entity extraction module 216, a graph evaluation module 218, and a tag cluster module 220. The modules may include routines, programs, instructions, objects, and/or data structures that perform particular tasks or implement particular abstract data types. The computing devices 202 may also implement a data store 222 that stores data used by the correlation engine 102.

The tag collection module 208 may collect the tags 118 for the items 116 from one or more sources. In various embodiments, the tag collection module 208 may collect the tags for an item from a website that invites members of the public to contribute tags for the item. For example, an online merchant that is using the correlation engine 102 may provide a web page for an item that is offered for sale. The web page may include a text entry section in which a user may enter one or more tags that the user feels describes the item. Alternatively or concurrently, the tag collection module 208 may also collect the tags for the items 116 from websites that publish tags for items. For example, a product review website may provide tags for items being reviewed, in which the tags are assigned to each item by expert or amateur reviewers. In such an example, the tag collection module 208 may use a web crawler application to visit such websites for tags that are related to the items 116. The tag collection module 208 may store the tags that are obtained for each item in the tag database 224.

The tag validation module 210 may validate the tags that are collected for each of the items 116 by corroborating the tags with corroboration data 226. The tag validation module 210 may extract the corroboration data 226 from one or more secondary sources. The secondary sources may include online reviews, comments, blogs and/or other sources of data. For example, the online merchant described above may also provide item review web pages where customers may leave user feedbacks regarding items that they have purchased. Accordingly, the tag validation module 210 may access such item review web pages to obtain information from the reviews. Alternatively or concurrently, the tag validation module 210 may also use a web crawler application to visit multiple online web pages that contain descriptive information or commentaries regarding the items 116.

Once the tag validation module 210 has obtained the text from a source, the tag validation module 210 may use a data mining algorithm to extract one or more keywords from the text. The keywords extracted may be individual keywords (e.g., "awesome") or terms that are formed by multiple keywords (e.g., action and adventure). In various embodiments, the data mining algorithm may use linguistic processors, such as part-of-speech taggers, phrase chunking programs, or other natural language processors to obtain keywords from the text. In order to validate the tags that are collected for an item, the tag validation module 210 may compare the tags assigned to the items to the keywords that are extracted from the one or more secondary sources for the items. In at least one embodiment, a tag may be considered by the tag validation module 210 to be valid when the content of tag matches the one or more extracted keywords. For example, the tag "action and adventure" may be considered valid for an item when "action and adventure" are also keywords that are extracted from a review of the item.

In other embodiments, the tag validation module 210 may consider a tag of an item to be valid when the tag expresses a concept that is similar in meaning to one or more extracted keywords. For example, a tag of an item and a keyword extracted for the item may be synonyms. In such embodiments, machine-learning based information extraction and logical reasoning techniques may be applied by the tag validation module 210 to perform such comparisons. Thus, by validating each tag that is assigned to an item, the tag validation module 210 may eliminate one or more tags that fail to describe the item. For example, a tag for a DVD copy of a movie may include the phrase "Blu-ray." Such a tag may be eliminated by the tag validation module 210 as there is no corroborating keyword found in the secondary sources. Accordingly, the validation of the tags by the tag validation module 210 may eliminate noise from the tags 118. The modifications to the tags that are assigned to each of the items 116 may be stored in the tag database 224.

The graph generation module 212 may execute the graph generation algorithm 108 to generate graphs based on the items 116, the tags 118, and/or the entities 122. In various embodiments, the graph generation module 212 may generate the bipartite graph 114 or the tripartite graph 120. The bipartite graph 114 may include two sets of nodes, in which each of the items 116 is represented by a corresponding item node and each of the tags 118 is represented by a corresponding tag node. Further, an item node may be connected to a tag node by an edge when a corresponding tag is used to describe a corresponding item.

The tripartite graph 120 may include three sets of nodes, with a tag node set, an item node set, and an entity node set. Each of the items 116 may be represented by a corresponding item node in the item node set, and each of the tags 118 may be represented by a tag node in the tag node set. Likewise, each of the entities 122 may be represented by an entity node in entity node set. The three sets of nodes may be connected by edges, in which an edge between an item node and a tag node may indicate that a corresponding tag is used to describe a corresponding item. Further, an edge between an entity node and an item node may indicate that a corresponding entity is related to a corresponding item.

In some embodiments, the graph generation module 212 may use the weight assignment module 214 to assign weights to each of the edges in the graphs. In one instance, the weight assigned to each edge in a graph may be directly proportional to a frequency that a tag is used by multiple users to describe a particular item. For example, ten out of all the users who contributed the tags 118 used a first tag "good vs. evil" to describe an item that is a DVD movie. On the other hand, only two out of all the users who contributed the tags 118 used a second tag "hero vs. villain" to describe the DVD movie. In such an example, an edge that connects a tag node of the first tag to an item node of the item may be weighted five times greater than an edge that connects a tag node of the second tag to the item node of the item, e.g., weight of "5" vs. weight of "1".

In another example, ten out of all the users who contributed the tags 118 used a first tag "car chase" to describe a first item that is a DVD movie. On the other hand, only five out of all the users who contributed the tags 118 used a second tag "romantic comedy" to describe a second item that is another DVD movie. In such an example, an edge that connects a tag node of the first tag to an item node of the first item may be weight two times great than the edge that connects a tag node of the second tag to an item node of the second item, e.g., weight of "2" vs. weight of "1".

In another instance, the weight assigned to each edge in a graph may be inversely proportional to a frequency that a tag is used by multiple users to describe each item. Thus, in the example above that involves the "good vs. evil" and "hero vs. villain" tags, the edge that connects the tag node of the second tag to the item node of the item may be weighted five times greater than the edge that connects the tag node of the first tag to the item node of the item. Likewise, the example above that involves the "car chase" and "romantic comedy" tags, the resulting weighting may be reversed as well. The use of inversely proportional weight may be based on an observation that tags that are the most frequently assigned to one or more items by users may not be the most descriptive. For example, tags such as "awesome" and "cool" may be the most frequently assigned tags for a movie, but such tags do not serve to either describe the movie or distinguish the movie on a substantive basis from other movies.

In other instances, the weight assignment module 214 may perform mid-frequency focused weighting for the edges. In mid-frequency focused weighting, a frequency for each unique assignment of a tag to an item by the multiple users may be obtained for all the tags and items. Subsequently, corresponding edges in a graph that connect tags to items may be weighted such that only a predetermined middle range of assignment frequencies are weighted more heavily. Further, edges in the graph that correspond to most frequently and least frequently occurring assignments of tags to items may be weighted less heavily. For example, assuming that w represents weight, the edge weighting may as follows: $w_1$="2" for the edges associated with tag assignments belonging in a top range of occurrence frequencies (e.g., 20%), $w_2$="3" for the edges associated with tag assignments belonging in a middle range of occurrence frequencies (e.g., 60%), and $w_3$="1" for the edges associated with tag assignments belonging to a bottom range of occurrence frequencies (e.g., 20%). However, in other examples, other weighing value combinations may be used for $w_1$, $w_2$, and $w_3$, such as {$w_1$="1", $w_2$="3", and $w_3$="2"} or {$w_1$="2", $w_2$="3", and $w_3$="2"}. Moreover, the range divisions may also vary in additional examples, as long as there are three ranges for the occurrence frequencies, with the middle range being weighted most heavily. The mid-frequency focused weighting may be based on the observation that tags that are the most frequently assigned to one or more items by users may be not the most descriptive, while the tags that are least frequency assigned may be the results of assignment errors, misidentifications of items, and/or other mistakes.

In additional embodiments, the weight assignment module 214 may assign a weight to each edge based on a characteristic of an item whose item node is connected to a tag by the edge. In one instance, the weight assignment module 214 may assign weights that are based on the search frequencies for items. For example, when an item is the subject of ten searches over a predetermined time period, the weight assignment module 214 may assign a proportional weight (e.g., a weight of "10") to each edge that connects the item node of item to a tag node of a corresponding tag. However, when an item is the subject of five searches over the predetermined time period, the weight assignment module 214 may assign a proportional weight (e.g., a weight of "5") to each edge that connects the item node of the item to a tag node of a corresponding tag.

In still other embodiments, the weight assignment module 214 may combine multiple weight techniques to calculate weights for the edges. For example, direct proportional weighting, indirect proportional weighting, or mid-frequency focused weighting based on frequency of tag assignments to tags may be combined with item characteristic-based weighting. Such combination may involve addition, averaging, or other mathematical manipulation of two weights for each edge to obtain a corresponding final weight for each edge.

In yet other embodiments, the weight assignment module 214 may assign weights to the edges proportionally or inverse proportionally based on other factors. Such factors may include the ranking of the tags provided by another source. For example, the tags may be assigned ranking scores by a machine-learning algorithm or a human reviewer based on the perceived descriptiveness of each tag. The factors may also include an amount of trust placed in each of the reviewers that contributed each of the tags as reflected by trust scores. Each trust score may reflect a reputation of a reviewer for providing accurate and/or descriptive tags, as rated by other peer reviewers in the community and/or the public at large. Additionally, in some instances, the scores obtained using such factors may be combined with values obtained using other techniques to calculate the weights for the edges. However, the factors for assigning weights are not limited to those that are described above and that one or more other factors may be used in other embodiments.

The entity extraction module 216 may extract entities 122 based on their relationships to the items 116. An entity may be related to an item when the entity contributed to the production of the item, offered the item for sale, purchased the item, or is otherwise involved in some aspect of the creation to use cycle of the item. For example, in an instance in which items are movies and the correlation engine 102 is seeking entities in the form of the movie directors of the DVD movies, the entity extraction module 216 may use a data search algorithm to extract the movie director information for the DVD movies. The entity extraction module 216 may extract the movie director information from one or more sources, such as an Internet-based movie information database. In another example, the items may be books and the entities to be extracted may be customers of a merchant who have purchased such books. In such an example, the entity extraction module 216 may perform a database query on a customer database of the merchant to ascertain customers that have purchased the books. Thus, in various embodiments, the entity extraction module 216 may use different data extraction and/or data mining algorithms to obtain information on entities that are related to the items from multiple sources. The information may include the identities of the entities, personal information on the entities, histories on the entities, behaviors of the entities, and/or so forth.

The graph evaluation module 218 may apply the random walk algorithm 112 to the graphs that are generated by the graph generation module 212, such as the bipartite graph 114 or the tripartite graph 120, to generate the association data 124. In some embodiments, the random walk algorithm 112 may be a label propagation algorithm. With respect to the bipartite graph 114, the graph evaluation module 218 may apply the random walk algorithm 112 to obtain a ranked list of tags for each of the items 116. Each tag in the ranked list of tags for a particular item may be a tag that is determined to be descriptive of the item, with the list being organized from the most descriptive tag to the least descriptive tag. For example, a ranked list of tag for the DVD movie "Star Wars Episode I" may include the ranked tags "good vs. evil," "Darth Maul," "Jedi Knights," "light saber action," "pod races," etc.

The application of the random walk algorithm 112 to the bipartite graph 114 may also lead to the discovery of correlations between each tag and one or more other tags of the tags 118. The random walk algorithm 112 may correlate a tag with one or more other tags of the tags 118 based on similarities in the meanings of the tags. For example, the tags "good vs. evil" and "hero vs. villain" may be correlated together. Accordingly, the graph evaluation module 218 may discover a corresponding set of correlated tags for each tag of the set of tags. In some embodiments, the tags in a set of correlated tags that are produced for each tag may also be ranked according to the degrees of their similarity to the tag.

Thus, in at least one embodiment, the graph evaluation module 218 may assign a unique label to each tag node in the set of tag nodes. Subsequently, the graph evaluation module 218 may execute the random walk algorithm 112 on the bipartite graph 114 until convergence of the graph is reached. In some instances, the bipartite graph 114 that is processed may include weighted edges. The execution of the random walk algorithm 112 by the graph evaluation module 218 may produce the ranked list of tags for each of the items 116, as well as the correlations between each tag and one or more other tags of the tags 118.

In other embodiments, the graph evaluation module 218 may apply the random walk algorithm 112 to the bipartite graph 114 to discover correlations between the items 116. An item that correlates with another item may share traits with that item. In such embodiments, the graph evaluation module 218 may assign a unique label to each item node in the set of item nodes. Subsequently, the graph evaluation module 218 may execute the random walk algorithm 112 on the bipartite graph 114 until convergence of the graph is reached. In some instances, the bipartite graph 114 that is processed may include weighted edges. The execution of the random walk algorithm 112 by the graph evaluation module 218 may produce correlations between each item and one or more other items of the items 116. Each correlation may indicate that two item share similar characteristics. For example, in a scenario in which two correlated items are DVD movies, the correlation may indicate that the two DVD movies have similar plots. In some embodiments, the items in a set of correlated items that are produced for each item may also be ranked according to their degrees of similarity to the item.

With respect to the tripartite graph 120, the graph evaluation module 218 may apply the random walk algorithm 112 to obtain a ranked list of tags for each of the entities 122. Each tag in the ranked list of tags for a particular entity may be a tag that is determined to be descriptive of the entity, with the list being organized from the most descriptive tag to the least descriptive tag. For example, a ranked list of tag for a particular entity that is a movie director may include the ranked tags "action adventure," "science fiction," "big budget," "high gross film," etc.

Thus, in at least one embodiment, the graph evaluation module 218 may assign a unique label to each tag node in the set of tag nodes. Subsequently, the graph evaluation module 218 may execute the random walk algorithm 112 on the tripartite graph 120 until convergence of the graph is reached. In some instances, the tripartite graph 120 that is processed may include weighted edges. The execution of the random walk algorithm 112 by the graph evaluation module 218 may produce the ranked list of tags for each of the entities 122. In various embodiments, the execution of the random walk algorithm 112 to process a graph may be guided by the weights that are assigned to the edges in the graph.

In further embodiments, the graph evaluation module 218 may assign a shared label to two or more tag nodes and/or two or more items in a bipartite graph or a tripartite graph. In other words, each of the tag nodes and/or item nodes in the bipartite graph or the tripartite graph may not be assigned a unique label. There may be one or more of such shared labels assigned to the nodes in the bipartite graph or tripartite graph. Alternatively or concurrently, the graph evaluation module 218 may not assign a label to at least one tag node or at least one item node. The graph evaluation module 218 may execute a random walk algorithm on these bipartite graphs to obtain correlation information. For example, the graph evaluation module 218 may execute the random walk algorithm 120 on a bipartite graph in which multiple tag nodes have been assigned a shared label. The execution may lead to the discovery of a ranked list of tags for each item or tags that correlate with each tag.

In another example, the graph evaluation module 218 may execute the random walk algorithm 120 on a bipartite graph for an item classification purpose. In such an example, the graph evaluation module 218 may assign a first shared label to a first group of multiple item nodes in the bipartite graph, a second shared label to a second group of multiple item nodes in the bipartite graph, and a third shared label to a third group of multiple item nodes in the bipartite graph. In some instances, the graphic evaluation 218 may refrain from assigning a corresponding label to one or more item nodes, as each of these item nodes does not represent an item that fits into any particular group. Each of the shared labels may be a name for a corresponding classification category. The execution of the random walk algorithm 120 on such a bipartite graph may classify the items into multiple classification categories.

The tag cluster module 220 may generate clusters of tags based on strength of association between the tags 118. The clusters of tags may be incorporated into the bipartite graph 114 or the tripartite graph 120 for processing by the graph evaluation module 218. In particular, rather than corresponding to a particular tag, each tag node in the bipartite graph 114 or the tripartite graph 120 that is processed by the graph evaluation module 218 may instead correspond to a tag cluster.

In order to obtain a tag cluster, the tag cluster module 220 may construct a graph that is similar to the bipartite graph 114, in which the graph includes a set of item nodes and a set of tag nodes. The set of item nodes may correspond to the items 116, and the set of tag nodes may correspond to the tags 118. The tag cluster module 220 may then obtain a chi-squared computation score for each unique pair of tag nodes in the graph. The chi-squared scores may indicate whether the co-occurrence of any two tag nodes with respect to the items is more than by random chance. Thus, the tag cluster module 220 may connect tag nodes with edges based on the respective chi-squared computation scores, in which the strengths of the edges reflect their respective score values. In other words, the more frequently that a particular pair of tag nodes appeared together with respect to the item nodes, the stronger the edge that connects the particular pair of tag nodes. On the other hand, the less frequently that a particular pair of tag nodes appeared together with respect to the item nodes, the weaker the edge that connects the particular pair of tag nodes. The strength of each edge may be reflected in a strength value that is similar to a weight value.

Once the tag nodes in the graph have been connected with edges, the tag cluster module 220 may execute a clustering algorithm (e.g., a random walk algorithm) to analyze the edges between the tag nodes and their strengths in order to cluster the corresponding tags into tag clusters. Once the tag clusters are formed, the tag cluster module 220 may further assign a unique cluster identifier to each tag cluster. For example, tag nodes that correspond to the tags "cowboy," "boots," and "pistol duel" may be clustered, such that the tags form a tag cluster. Further, the tag cluster module 220 may assign a cluster identifier of "western" to the tag cluster. In another example, tag nodes that corresponding to the tags "mob," "detective," "crime," and "drugs" may be clustered, such that the tags form a tag cluster. Further, the tag cluster module 220 may assign a cluster identifier of "mafia" to the tag cluster. The tag cluster module 220 may store the tag clustering information, including cluster identifiers, as cluster data 228 in the data store 222.

The graph evaluation module 218 may evaluate the bipartite graph 114 or the tripartite graph 120 having tag nodes that correspond to tag clusters in the same manner as when each tag node corresponds to a single tag. However, since each tag node corresponding to a tag cluster, the graph evaluation module 218 may use the tag cluster module 220 work backwards to ascertain the actual tags that are associated with an item or entity at a final phase. For example, a ranked list of tag clusters associate with an item may include a tag cluster having the cluster identifier "western". Accordingly, the graph evaluation module 218 may use the tag cluster module 220 to work backwards and determine that the item is actually associated with the tags "cowboy," "boots," and "pistol duel" based on the information in the cluster data 228.

The search engine 104 and the recommendation engine 106 may use the association data 124 to produce recommendations of items to user. As described above, the search engine 104 may use the association data 124 to provide search results to a user. The recommendation engine 106 may use the association data 124 to generate recommendations as a user selects items from a web page for viewing or provide personalized recommendations.

The data store 222 may store the data that are used by correlation engine 102, the search engine 104, and the recommendation engine 106. In various embodiments, the data store 222 may store the tag database 224, the corroboration data 226, the association data 124, and the cluster data 228. Each set of data may be stored via a data table, a data array, and/or other data storage structures.

Example Graphs

Figure 3:
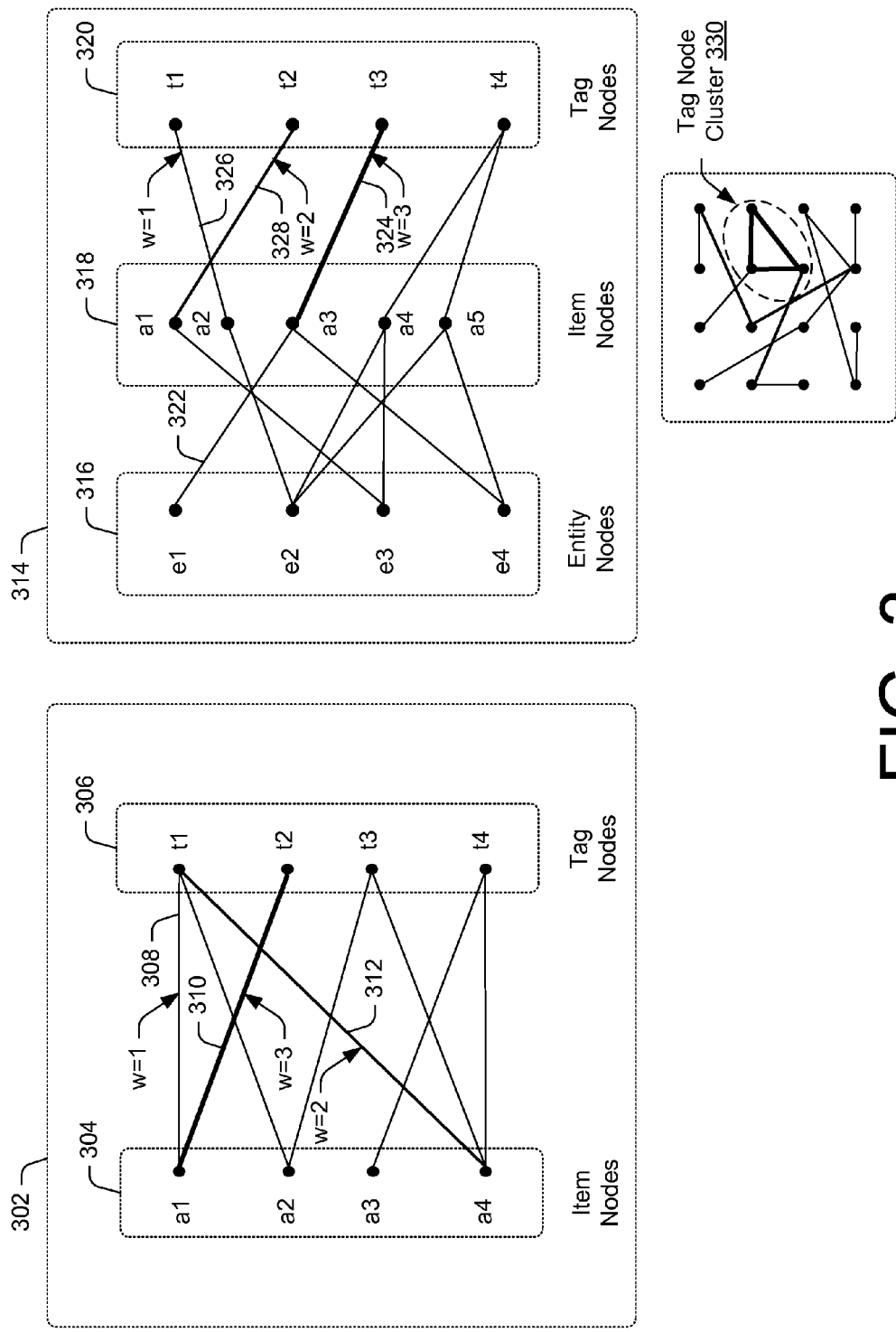
FIG. 3 is a block diagram that illustrates example graphs that are analyzed to discover associations between items and tags or between entities and tags.

FIG. 3 is a block diagram that illustrates example graphs that are analyzed by the correlation engine 102 to discover associations between items and tags or between entities and tags. As shown, a bipartite graph 302 may include a set of item nodes 304 and a set of tag nodes 306. Each of the item nodes 304 may be a node for a corresponding item. Each of the tag nodes 306 may be a node for a corresponding tag or tag cluster. Each of the item nodes 304 may be linked to one or more of the tag nodes 306 by edges. For example, as shown, the item node "a1" may be linked to the tag node "t1" by the edge 308. The item node "a1" may be further linked to the tag node "t2" by the edge 310. In some embodiments, the edges that link item nodes to tag nodes may be weighted according to a respective frequency that each tag is used to describe a corresponding item. For example, as shown, the edge 308 may have a weight of "1", while the edge 310 may have a weight of "3". Likewise, an edge 312 that connects the item node "a4" to the tag node "t1" may have a weight of "2". The bipartite graph 302 may be processed by the correlation engine 102 to produce association data that shows the relationships for and between the items that are represented by the item nodes 304 and the tags that are represented by the tag nodes 306. In various embodiments, other bipartite graphs, such as the bipartite graph 114, may be functionally similar to the bipartite graph 302.

The tripartite graph 314 may include a set of entity nodes 316, a set of item nodes 318, and a set of tag nodes 320. Each of the entity nodes 316 may be a node for a corresponding entity. Each of the item nodes 318 may be a node for a corresponding item. Likewise, each of the tag nodes 320 may be a node for a corresponding tag or tag cluster. Each of the entity nodes 316 may be linked to one or more of the item nodes 318 by edges. For example, as shown, the entity node "e1" may be linked to the item node "a3" by the edge 322. In turn, each of the item nodes 318 may be linked to one or more of the tag nodes 320 by edges. For example, the item node "a3" may be linked to the tag node "t3" by the edge 324. In some embodiments, the edges that link item nodes to tag nodes may be weighted according to a respective frequency that each tag is used to describe a corresponding item. For example, as shown, the edge 324 may have a weight of "3". However, an edge 326 that connects the item node "a2" to the tag node "t1" may have a weight of "1". Further, an edge 328 that connects the item node "a1" to the tag node "t2" may have a weight of "2". The tripartite graph 314 may be processed by the correlation engine 102 to produce association data that shows the relationships between the entities that are represented by the entity nodes 316 and the tags that are represented by the tag nodes 320. In various embodiments, other tripartite graphs, such as the tripartite graph 120, may be functionally similar to the tripartite graph 314.

As described above, each of the tag nodes in a bipartite graph or a tripartite graph may correspond to an individual tag or a tag cluster. A tag cluster may be discovered via a corresponding tag node cluster, such as the tag node cluster 330. As shown, the tag node cluster 330 may include tag nodes that are connected by edges having strengths that cause a clustering algorithm to cluster them together. The strength of each edge may reflect a chi-squared computation score of co-occurrence of two tag nodes. Each of the tag nodes in the tag node cluster 330 is representative of a corresponding tag. In various embodiments, at least one tag node in a bipartite graph or a tripartite graph may represent a tag cluster instead of a tag.

Illustrative Operations

FIGS. 4-9 show illustrative processes 400-900 that implement graph-based semantic analysis of items. Each of the processes 400-900 is illustrated as a collection of steps in a logical flow diagram, which represents a sequence of operations that can be implemented in hardware, software, or a combination thereof. In the context of software, the steps represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, the processes 400-900 are described with reference to the architecture 100 of FIG. 1.

Figure 4:
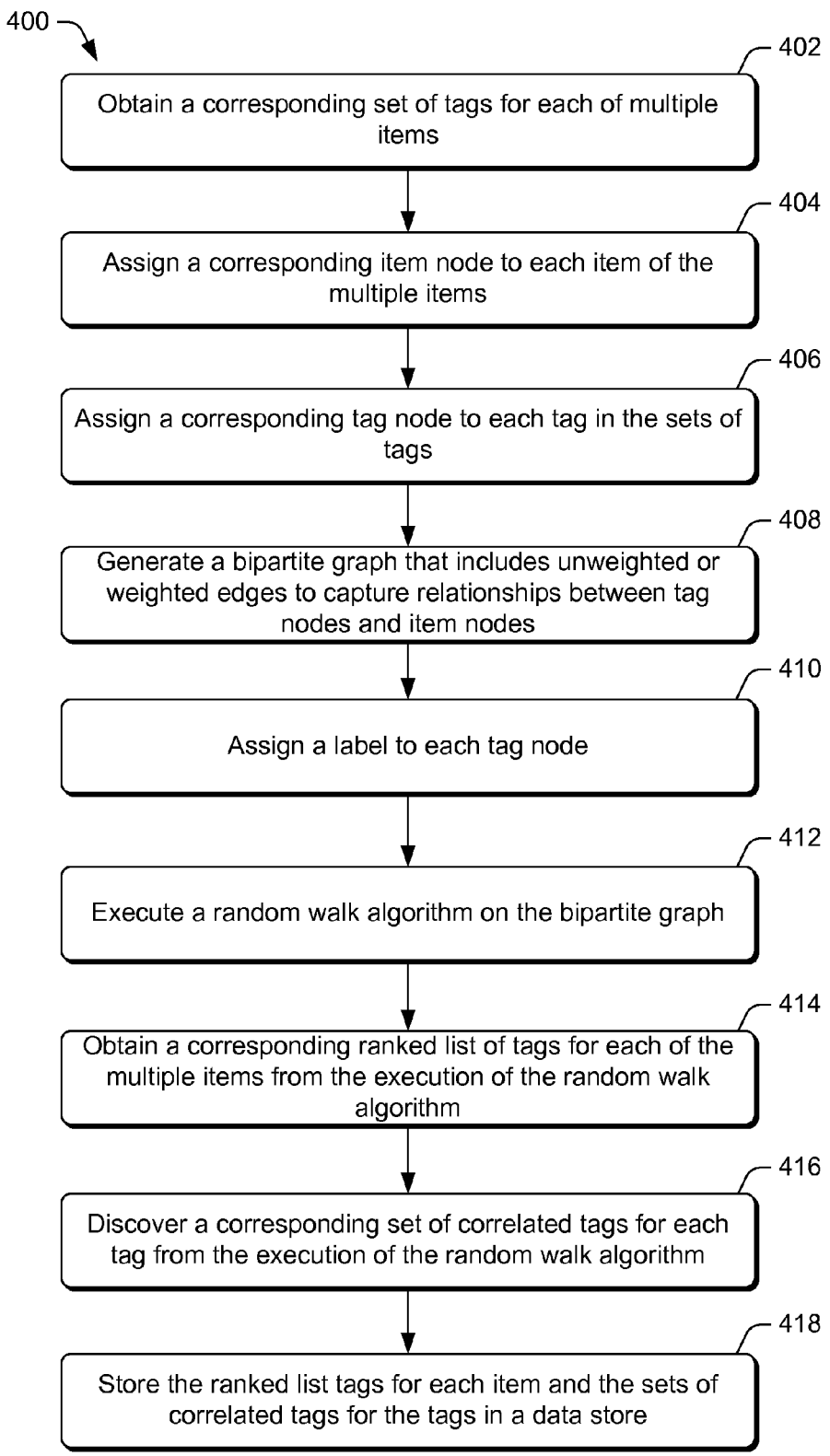
FIG. 4 is a flow diagram of an illustrative process for using a bipartite graph to discover one or more top ranked tags for an item.

FIG. 4 is a flow diagram of an illustrative process 400 for using a bipartite graph to discover one or more top ranked tags for an item. At block 402, the tag collection module 208 may obtain a corresponding set of one or more tags for each of the multiple items, such as the items 116. Each of the tags for an item may be a phrase that is assigned to the item in order to describe an aspect of the item. The tags for an item may be from a collection tags, such as the tags 118. In some embodiments, each of the items may be a tangible or intangible product, or a bundle of such products. In other embodiments, each of the items may be a service or a bundle of services.

At block 404, the graph generation module 212 may assign a corresponding item node to each item. Each item node may have a node identifier that associates the item node with the item that the node represents. The graph generation module 212 may include the resultant set of item nodes in a bipartite graph. At block 406, the graph generation module 212 may assign a corresponding tag node to each tag in the set of tags. Each tag node may have a node identifier that associates the tag node with the tag that the node represents. The graph generation module 212 may include the resultant set of item nodes in a bipartite graph.

At block 408, the graph generation module 212 may generate a bipartite graph, such as the bipartite graph 114, that include unweighted or weighted edges to capture relationships between the set of tag nodes and the set of item nodes. In various embodiments, an item node may be connected to a tag node by an edge when a corresponding tag is used to describe a corresponding item. Further, in some embodiments, the weighting of an edge may be based on a frequency that a particular tag is assigned to a specific item. The weight assignment module 214 may assign the weights to the edges. The weight of an edge may be numerical value attribute that is taken into consideration by the random walk algorithm by the random walk algorithm during the execution of a random walk algorithm. In other words, the weight of the edge may guide the execution of the random walk algorithm.

At block 410, the graph evaluation module 218 may assign a label to each tag node. In some embodiments, the graph evaluation module 218 may assign a unique label to each tag node. In such embodiments, each label may be a unique string of numerical values or text, or a combination of both, that serve to distinguish a particular tag node from other tag nodes. The labels may provide input data for the operation of the random walk algorithm 112. In other embodiments, the graph evaluation module 218 may label the tag nodes such that every tag node in the bipartite graph is assigned a label, but each of one or more sets of multiple tag nodes in the bipartite graph is assigned a corresponding shared label. However, in some alternative instances of the above embodiments, the graph evaluation module 218 may skip the assignment of a label to at least one tag node in the bipartite graph. At block 412, the graph evaluation module 218 may execute the random walk algorithm 112 on the bipartite graph.

At block 414, the graph evaluation module 218 may obtain a corresponding ranked list of tags for each of the multiple items from the execution of the random walk algorithm 112. Each ranked list of tags may include tags that have been found to be associated with an item, i.e., describe the item, in which the tags are ranked from the most descriptive to the least descriptive, or vice versa.

At block 416, the graph evaluation module 218 may discover a corresponding set of correlated tags for each tag from the execution of the random walk algorithm 112. A set of correlated tags for a particular tag may include one or more tags that are similar in meaning to the particular tag. For example, the particular tag may be "good vs. evil" and one of the correlated tags for the particular tag may be "hero vs. villain."

At block 418, the graph evaluation module 218 may store the ranked list of tags of each item as part of the association data 124 in the data store 222. In some embodiments, rather than storing the entire ranked list for an item, the graph evaluation module 218 may select and store one or more top ranked tags from the ranked list for the item in the data store 222. Likewise, the graph evaluation module 218 may also store the sets of correlated tags for the tags as part of the association data 124 in the data store 222. In some embodiments, rather than storing the entire set of correlated tags for a particular tag, the graph evaluation module 218 may select and store one or more tags with the strongest correlation to the particular tag in the data store 222.

Figure 5:
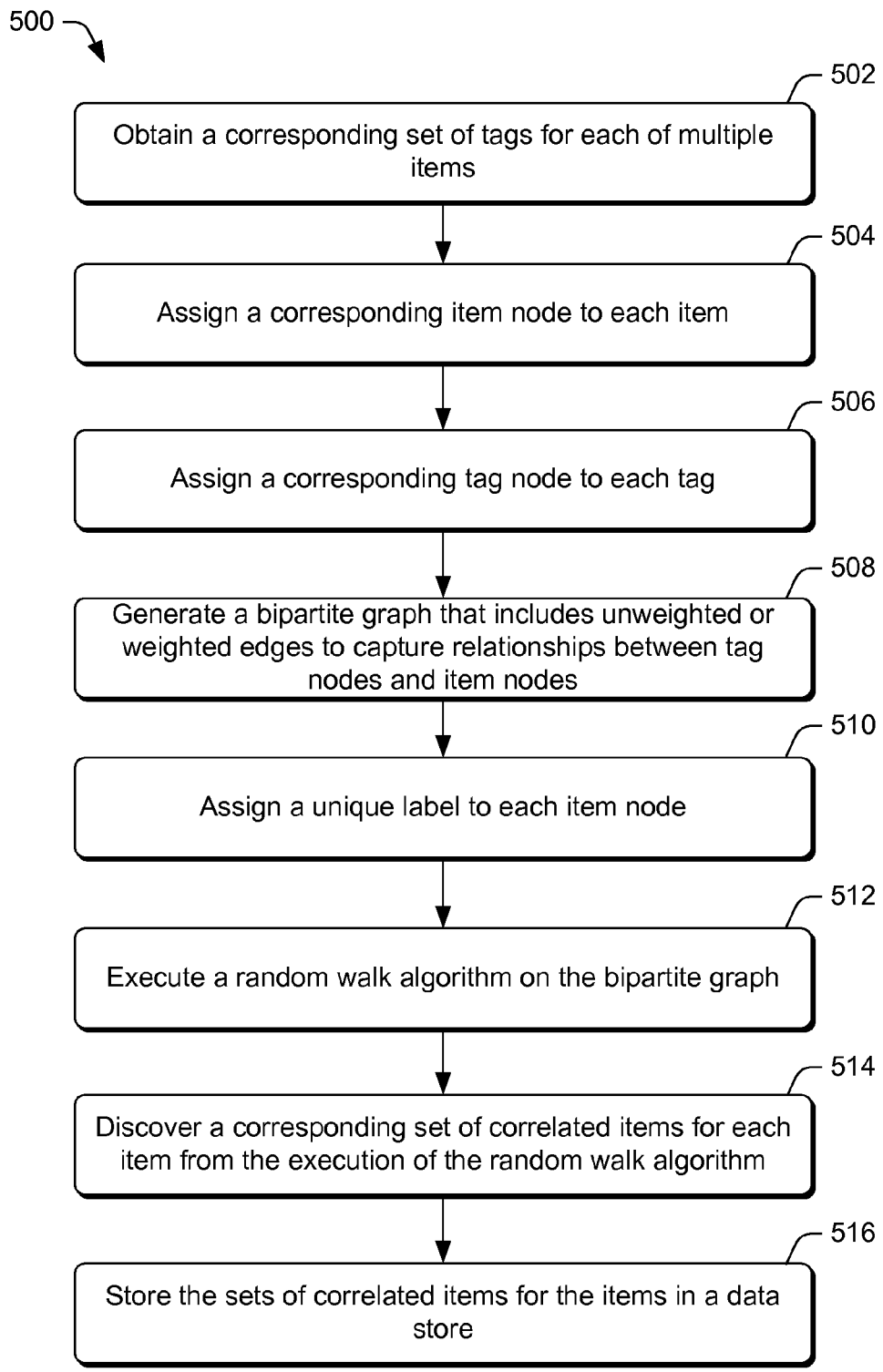
FIG. 5 is a flow diagram of an illustrative process for using a bipartite graph to discover correlations between items based on tags used to describe the items.

FIG. 5 is a flow diagram of an illustrative process 500 for using a bipartite graph to discover correlations between items based on tags used to describe the items. At block 502, the tag collection module 208 may obtain a corresponding set of one or more tags for each of the multiple items, such as the items 116. Each of the tags for an item may be a phrase that is assigned to the item in order to describe an aspect of the item. The tags for an item may be from a collection tags, such as the tags 118. In some embodiments, each of the items may be a tangible or intangible product, or a bundle of such products. In other embodiments, each of the items may be a service or a bundle of services.

At block 504, the graph generation module 212 may assign a corresponding item node to each item. Each item node may have a node identifier that associates the item node with the item that the node represents. The graph generation module 212 may include the resultant set of item nodes in a bipartite graph. At block 506, the graph generation module 212 may assign a corresponding tag node to each tag in the set of tags. Each tag node may have a node identifier that associates the tag node with the tag that the node represents. The graph generation module 212 may include the resultant set of item nodes in a bipartite graph.

At block 508, the graph generation module 212 may generate a bipartite graph, such as the bipartite graph 114, that include unweighted or weighted edges to capture relationships between the set of tag nodes and the set of item nodes. In various embodiments, an item node may be connected to a tag node by an edge when a corresponding tag is used to describe a corresponding item. Further, in some embodiments, the weighting of an edge may be based on a frequency that a particular tag is assigned to a specific item. The weight assignment module 214 may assign the weights to the edges. The weight of an edge may be numerical value attribute that is taken into consideration by the random walk algorithm during the execution of a random walk algorithm. In other words, the weight of the edge may guide the execution of the random walk algorithm.

At block 510, the graph evaluation module 218 may assign a unique label to each item node. Each label may be a unique string of numerical values or text, or a combination of both, that serve to distinguish a particular item node from other item nodes. The labels may provide input data for the operation of the random walk algorithm 112. At block 512, the graph evaluation module 218 may execute the random walk algorithm 112 on the bipartite graph.

At block 514, the graph evaluation module 218 may discover a corresponding set of correlated items for each item from the execution of the random walk algorithm 112. A set of correlated items for a particular item may include one or more items that have similar traits as the particular item. For example, in an instance in which the particular item is a DVD movie, the one or more items may be one or more other DVD movies that have similar plots as the DVD movie.

At block 516, the graph evaluation module 218 may also store the sets of correlated items for each item as part of the association data 124 in the data store 222. In some embodiments, rather than storing the entire set of correlated items for a particular item, the graph evaluation module 218 may select and store one or more items with the strongest correlation to the particular item in the data store 222.

Figure 6:
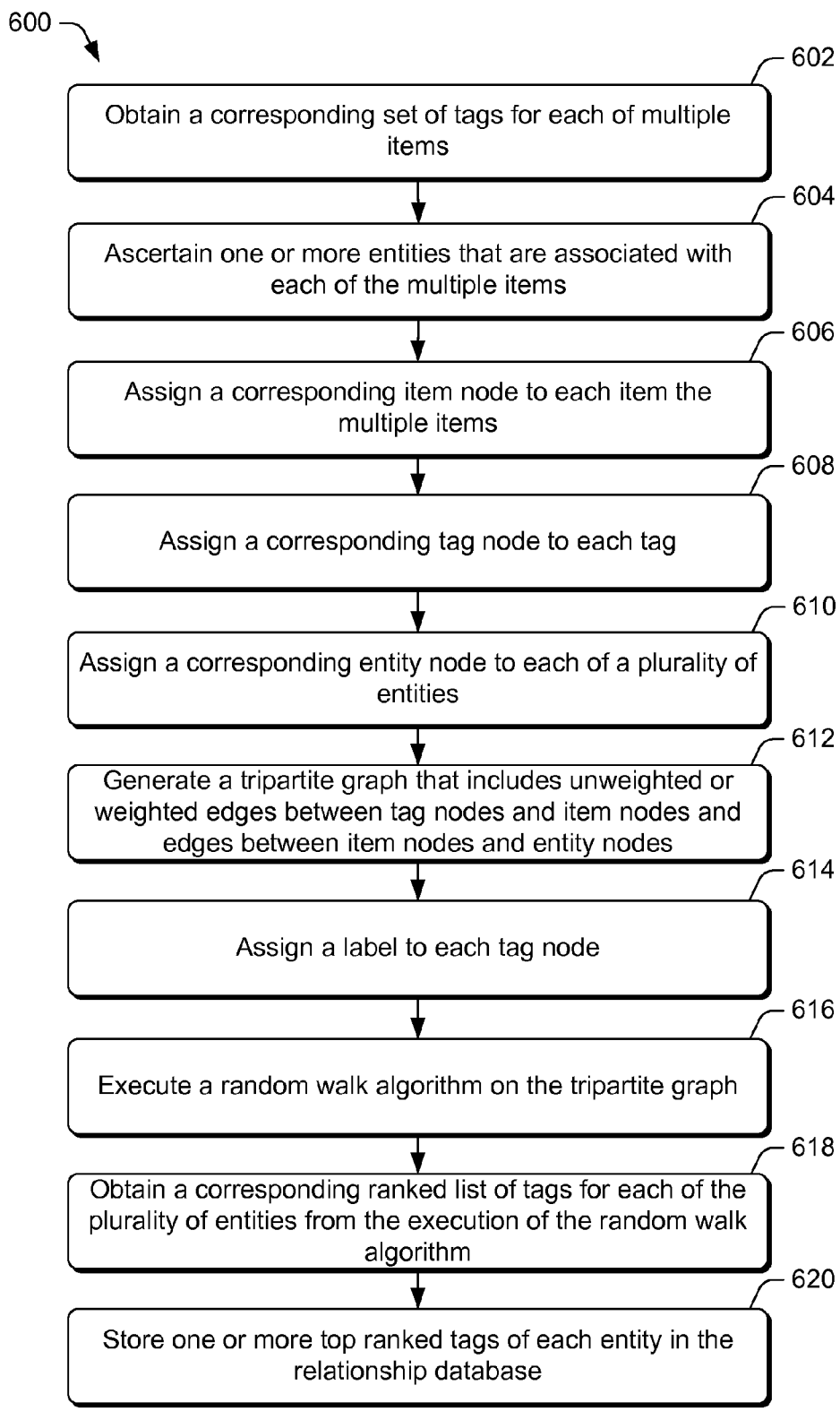
FIG. 6 is a flow diagram of an illustrative process for using a tripartite graph to discover one or more top ranked tags for an entity.

FIG. 6 is a flow diagram of an illustrative process 600 for using a tripartite graph to discover one or more top ranked tags for an entity. At block 602, the tag collection module 208 may obtain a corresponding set of one or more tags for each of the multiple items, such as the items 116. Each of the tags for an item may be a phrase that is assigned to the item in order to describe an aspect of the item. The tags for an item may be from a collection tags, such as the tags 118. In some embodiments, each of the items may be a tangible or intangible product, or a bundle of such products. In other embodiments, each of the items may be a service or a bundle of services.

At block 604, the entity extraction module 216 may ascertain one or more entities that are associated with each of the multiple items. An entity that is related to an item may be an entity that contributed to the production of the item, offered the item for sale, purchased the item, or is otherwise involved in some aspect of the creation to use cycle of the item. For example, with respect to an item that is a DVD copy of a movie, the entity that is related to the movie may be a movie director of the movie, an actor that starred in the move, a company that released the movie, or a customer that purchased the movie.

At block 606, the graph generation module 212 may assign a corresponding item node to each item. Each item node may have a node identifier that associates the item node with the item that the node represents. The graph generation module 212 may include the resultant set of item nodes in a tripartite graph. At block 608, the graph generation module 212 may assign a corresponding tag node to each tag in the set of tags. Each tag node may have a node identifier that associates the tag node with the tag that the node represents. The graph generation module 212 may include the resultant set of item nodes in a tripartite graph.

At block 610, the graph generation module 212 may assign a corresponding entity node to each entity that is associated with one or more of the multiple items. At block 612, the graph generation module 212 may generate a tripartite graph, such as the tripartite graph 120, which includes edges to capture relationships between the set of tag nodes and the set of item nodes, as well as between the set of item nodes and the set of entity nodes. In various embodiments, an item node may be connected to a tag node by an edge when a corresponding tag is used to describe a corresponding item. Likewise, an item node may be connected to an entity node by an edge when a corresponding item is related to a corresponding entity. Further, in some embodiments, the edges between the set of tag nodes and the set of item nodes may be unweighted or weighted. The weighting of an edge may be based on a frequency that a particular tag is assigned to a specific item. The weight assignment module 214 may assign the weights to the edges. The weight of an edge may be numerical value attribute that is taken into consideration by the random walk algorithm during the execution of a random walk algorithm. In other words, the weight of the edge may guide the execution of the random walk algorithm.

At block 614, the graph evaluation module 218 may assign a label to each tag node. In some embodiments, the graph evaluation module 218 may assign a unique label to each tag node. In such embodiments, each label may be a unique string of numerical values or text, or a combination of both, that serve to distinguish a particular tag node from other tag nodes. In other embodiments, the graph evaluation module 218 may label the tag nodes in tripartite graph such that every tag node is assigned a label, but each of one or more sets of multiple tag nodes in the tripartite graph is assigned a corresponding shared label. However, in some alternative instances of the above embodiments, the graph evaluation module 218 may skip the assignment of a label to at least one tag node in the tripartite graph. The labels may provide input data for the operation of the random walk algorithm 112. At block 616, the graph evaluation module 218 may execute the random walk algorithm 112 on the tripartite graph.

At block 618, the graph evaluation module 218 may obtain a corresponding ranked list of tags for each of the plurality of entities from the execution of the random walk algorithm 112. Each ranked list of tags may include tags that have been found to be associated with an entity, i.e., describe the entity, in which the tags are ranked from the most descriptive to the least descriptive, or vice versa.

At block 620, the graph evaluation module 218 may store the ranked list of tags of each entity as part of the association data 124 in the data store 222. In some embodiments, rather than storing the entire ranked list for an entity, the graph evaluation module 218 may select and store one or more top ranked tags from a ranked list for the entity in the data store 222.

Figure 7:
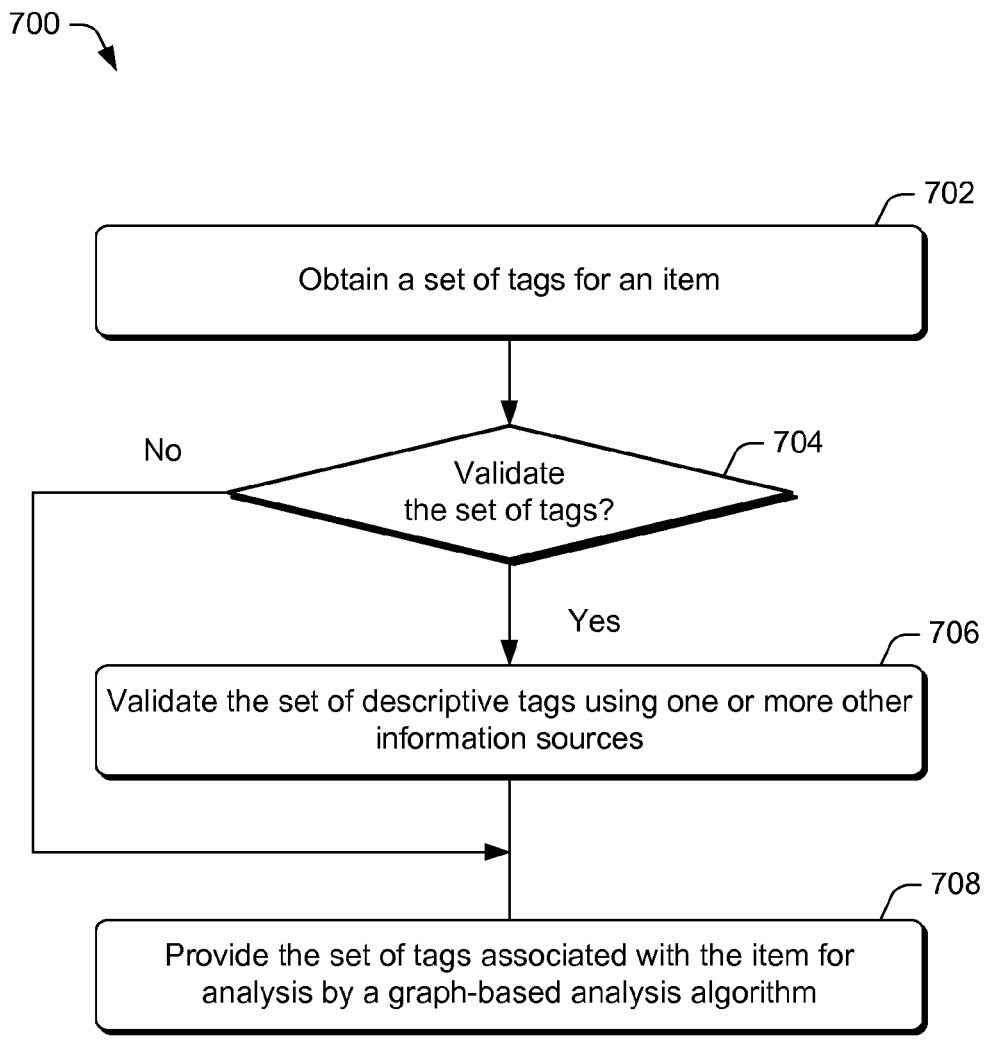
FIG. 7 is a flow diagram of an illustrative process for using additional sources information to validate tags.

FIG. 7 is a flow diagram of an illustrative process 700 for using additional sources information to validate tags. At block 702, the correlation engine 102 may obtain a set of one or more tags for each of an item. Each of the tags for the item may be a phrase that is assigned to the item in order to describe an aspect of the item. In some embodiments, the item may be a tangible or intangible product, or a bundle of such products. In other embodiments, the item may be a service or a bundle of services.

At decision block 704, the tag validation module 210 may determine whether to validate the set of tags. In various embodiments, the correlation engine 102 may make such a determined based on a user setting. Thus, if the tag validation module 210 determines that the tags are to be validated ("yes" at decision block 704), the process 700 may continue to block 706. At block 706, the tag validation module 210 may validate the tags by corroborating the tags with corroboration data 226.

In at least one embodiment, a tag may be considered by the tag validation module 210 to be valid when the content of tag matches the one or more extracted keywords in the corroboration data 226 that also describe the item. In other embodiments, the tag validation module 210 may consider a tag of an item to be valid when the tag expresses a concept that is similar in meaning to one or more extracted keywords in the corroboration data 226 that also describe the item. Thus, by validating each tag that is assigned to the item, the tag validation module 210 may eliminate one or more tags that fail to describe the item. At block 708, the tag validation module 210 may provide the set of tags associated with the item for analysis by a graph-based analysis algorithm, such as the random walk algorithm 112.

However, if the correlation engine 102 determines that the tags are not to be validated ("no" at decision block 704), the process 700 may continue to directly to block 708. Once again, at block 708, the tag validation module 210 may provide the set of tags associated with the item for analysis by a graph-based analysis algorithm, such as the random walk algorithm 112.

Figure 8:
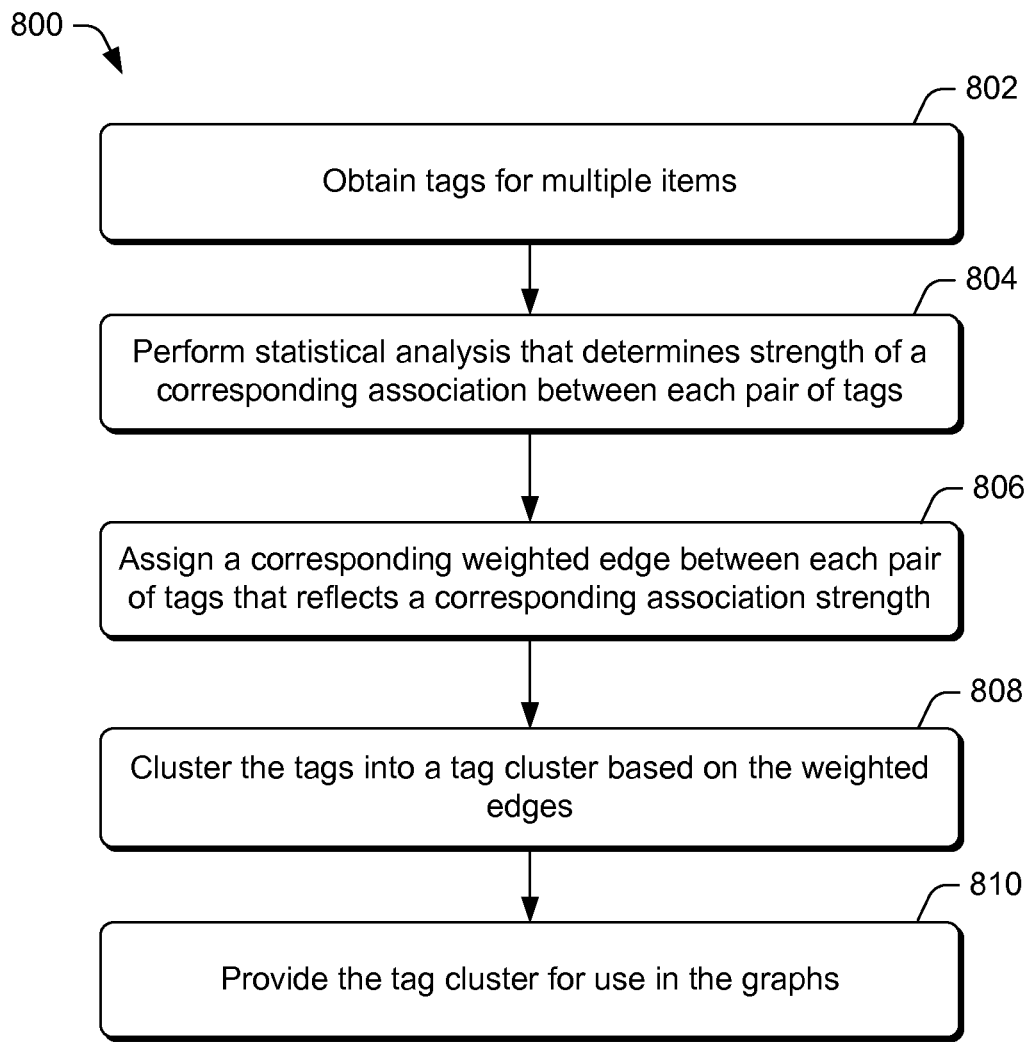
FIG. 8 is a flow diagram of an illustrative process for grouping tags into tag clusters that are used to discover associations among items, tags, or entities.

FIG. 8 is a flow diagram of an illustrative process 800 for grouping tags into tag clusters that are used to discover associations among items, tags or entities. At block 802, the tag collection module 208 may obtain tags for multiple items, such as the items 116. Each of the tags for an item may be a phrase that is assigned to the item in order to describe an aspect of the item. In some embodiments, each of the items may be a tangible or intangible product, or a bundle of such products. In other embodiments, each of the items may be a service or a bundle of services.

At block 804, the tag cluster module 220 may perform statistical analysis to determine strength of a corresponding association between each pair of tags. In various embodiments, the tag cluster module 220 may generate a graph that includes tag nodes, in which each tag node represents a corresponding tag. Further, the statistical analysis may be performed using a chi-squared algorithm. The chi-squared algorithm may provide a chi-squared computation score for each pair of tag nodes in the graph. The chi-squared scores may indicate whether the co-occurrence of any two tag nodes with respect to the items is more than by random chance.

At block 806, the tag cluster module 220 may connect the tag nodes with edges based on the respective chi-squared computation scores, in which the strengths of the edges reflect their respective score values. The strengths of the edges may be represented using corresponding weights that are assigned to the edges.

At block 808, the tag cluster module 220 may execute a clustering algorithm (e.g., a random walk algorithm) to analyze the weighted edges between the tag nodes and cluster the tag nodes to form a tag cluster of tags. The tag cluster module 220 may further assign a unique cluster identifier to the tag cluster.

At block 810, the tag cluster module 220 may provide the tag cluster for use in the graphs, such as the bipartite graph 114 and the tripartite graph 120. In such scenarios, a tag node in a graph may represent the tag cluster rather than an individual tag. Otherwise, such graphs may be evaluated by the graph evaluation module 218 in similar manners as described in the processes 400-600. However, since each tag node corresponding to a tag cluster, the graph evaluation module 218 may use the tag cluster module 220 to work backwards and ascertain the actual tags that are associated with an item or entity at a final phase each process.

Figure 9:
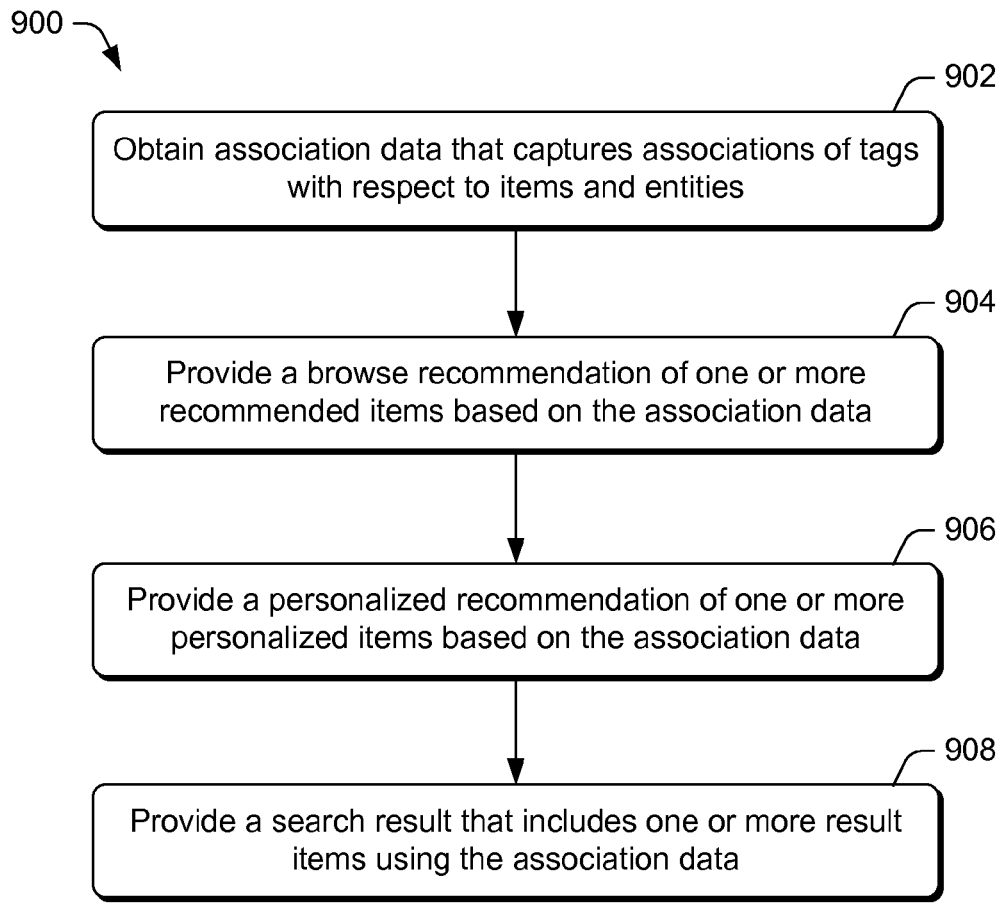
FIG. 9 is a flow diagram of an illustrative process for providing recommendations and search results to a user based on the associations among items, tags, or entities.

FIG. 9 is a flow diagram of an illustrative process 900 for providing recommendations and search results to a user based on the associations among items, tags or entities. At block 902, the correlation engine 102 may obtain association data 124 that captures associations of tags with respect to items and entities. Each of the tags for the item may be a phrase that is assigned to the item in order to describe an aspect of the item. In some embodiments, the item may be a tangible or intangible product, or a bundle of such products. In other embodiments, the item may be a service or a bundle of services. An entity that is related to an item may be an entity that contributed to the production of the item, offered the item for sale, purchased the item, or is otherwise involved in some aspect of the creation to use cycle of the item.

At block 904, the recommendation engine 106 may provide a browse recommendation of one or more recommended items based on the association data. For example, when the user indicates an interest in a particular item 130 that that is shown in a webpage, the recommendation engine 106 may update the web page or another web page to display recommended items 132 that have similar traits to the particular item. The user may indicate the interest in the particular item by viewing the item, purchasing the item, posting a review for the item, providing a tag for the item, rating the item, and/or perform other actions with respect to the item.

At block 906, the recommendation engine 106 may provide a personalized recommendation of one or more personalized items based on the association data. For example, when the association data 124 indicates that the correlation engine 102 has attributed a characteristic of outdoor enthusiast to an entity that is a customer, the recommendation engine 106 may customize a web page that is displayed to the customer to show outdoor gears and products.

At block 908, the search engine 104 may provide a search result that includes one or more result items using the association data. For example, when a user inputs a search query 126 for a particular item into the search engine 104, the search engine 104 may provide an item that matches the search query, as well as one or more relevant items 128 that have similar traits to the matching item. In another example, the search engine 104 may use the association data 124 to provide recommendations of items based on an input phrase that includes a tag. However, it will be appreciated that not all of the blocks 904-908 may be performed in other embodiments, as long as one of these blocks is performed.

In summary, the use of graph-based semantic analysis with respect to items and their tags may enable the discovery of the characteristics of items, the associations between items, and the characteristics of entities that are associated with the items. Such association data may enable a merchant to customize the distribution of item search results or item recommendations for customers. In this way, customers may benefit by discovering items that are suited to their individual tastes and needs. The merchant may benefit by receiving recurring business from repeat customers or additional business from new customers.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:

1. One or more non-transitory computer readable media storing computer-executable instructions that, when executed, cause one or more processors to perform acts comprising:

obtaining a set of tags for each of multiple items of a plurality of items, each tag describing an aspect of one or more items;

assigning a corresponding item node to each item and a corresponding tag node to each tag;

generating a partite graph that includes a plurality of item nodes and a plurality of tag nodes, each of the plurality of item nodes being connected to one or more of the plurality of tag nodes by a respective edge;

executing a label propagation algorithm on the partite graph following assignment of a label to each tag node, in which the partite graph is used to obtain a ranked list of tags for each of the one or more items of the multiple items or to discover a set of correlated tags for each of one or more tags, each label being a string of one or more values that is unique to a corresponding tag node;

storing at least one of one or more ranked tags from the ranked list of tags for each of the one or more items or one or more correlated tags from the set of correlated tags of each of the one or more tags as association data; and providing at least one of a browse recommendation of one or more recommended items or a search result that includes one or more result items based on the association data.

2. The one or more non-transitory computer readable media of claim 1, wherein the executing includes executing the label propagation algorithm on a bipartite graph that includes the plurality of item nodes and the plurality of tag nodes.

3. The one or more non-transitory computer readable media of claim 1, wherein the generating includes generating a bipartite graph, wherein the acts further comprises:

executing the label propagation algorithm on the bipartite graph following assignment of a unique label to each item node in which the partite graph is used to discover a set of correlated items for each of the one or more items, wherein a correlated item of a particular item shares at least one trait with the particular item; and storing one or more correlated items from the set of correlated items for each of the one or more items in the association data.

4. The one or more non-transitory computer readable media of claim 1, wherein the generating includes generating a tripartite graph in which each of the item nodes is further connected to one or more entity nodes, each entity node representing a corresponding entity, and wherein the acts further comprise:

executing the label propagation algorithm to obtain a ranked list of tags for each entity; and providing a personalized recommendation of the one or more items to an entity based on a particular ranked list of tags for the entity.

5. A method comprising:

under control of one or more computing systems being configured with specific executable instructions, obtaining a set of tags for each of multiple items of a plurality of items, each tag describing an aspect of one or more items;

generating a bipartite graph that includes an item node for each item of the multiple items and a tag node for each tag, each of the item nodes being connected to each of one or more tag nodes by a respective edge; and executing an algorithm on the bipartite graph to discover a set of correlated tags for each of one or more tags.

6. The method of claim 5, further comprising executing the algorithm to obtain a ranked list of tags for each of the one or more items or to discover a set of correlated items for each of the one or more items, wherein a correlated item of a particular item shares at least one trait with the particular item.

7. The method of claim 6, further comprising:

storing at least one of one or more ranked tags from the ranked list of tags for each of the one or more items, one or more correlated tags from the set of correlated tags for each of the one or more tags, or one or more correlated items from the set of correlated items of each of the one or more items as association data; and providing at least one of a browse recommendation of one or more recommended items or a search result that includes one or more result items based on the association data.

8. The method of claim 5, wherein the executing includes assigning a unique label to each item node, and executing a label propagation algorithm to discover a set of correlated items for each of the one or more items.

9. The method of claim 5, further comprising assigning a shared label to at least two item nodes, and executing the algorithm on the bipartite graph to discover item classifications for the multiple items.

10. The method of claim 5, wherein the obtaining includes validating a tag by invoking a data mining algorithm to extract one or more keywords from a text at an additional source that describes the item, and designating the tag for the item as valid in response to determining that the tag matches the one or more keywords or that the tag is similar in meaning to the one or more keywords.

11. The method of claim 5, wherein an edge that connects an item node to a tag node is weighted based on at least one of a frequency that an associated tag is used to describe an associated item or a frequency that the associated item is included in a plurality of search queries, and wherein propagation of labels by the algorithm is guided by a weight assigned to the edge.

12. The method of claim 6, wherein the executing includes assigning labels to at least some tag nodes in the bipartite graph, and executing a label propagation algorithm to obtain the ranked list of tags for each of the one or more items or to discover the set of correlated tags for each of the one or more tags, the label assigned to a particular tag node being unique to the particular tag node or shared between at least two tag nodes.

13. One or more non-transitory computer readable media storing computer-executable instructions that, when executed, cause one or more processors to perform acts comprising:

obtaining a set of tags for each of multiple items of a plurality of items, each tag describing an aspect of one or more items;

ascertaining one or more entities that are associated with each of the multiple items, each associated entity being a person or a group of persons involved in at least one of a creation, provision, or use of a corresponding item;

generating a tripartite graph that includes an item node for each item, a tag node for each tag, and an entity node for each entity, each of the item nodes being connected to one or more tag nodes and one or more entity nodes; and executing an algorithm on the tripartite graph to obtain a ranked list of tags for each of one or more entities.

14. The one or more non-transitory computer readable media of claim 13, wherein the acts further comprise:

storing one or more ranked tags from the ranked list of tags for each of the one or more entities as association data; and providing a personalized recommendation of one or more items to an entity based on the association data.

15. The one or more non-transitory computer readable media of claim 13, wherein the executing includes assigning labels to at least some tag nodes in the tripartite graph, and executing a label propagation algorithm to obtain the ranked list of tags for each of the one or more entities.

16. The one or more non-transitory computer readable media of claim 15, wherein the label assigned to a tag node is a unique label for the tag node or a label that is shared between the tag node and one or more other tag nodes.

17. The one or more non-transitory computer readable media of claim 13, wherein the obtaining includes validating a tag by invoking a data mining algorithm to extract one or more keywords from a text at an additional source that describes the item, and designating the tag for the item as valid in response to determining that the tag matches the one or more keywords or that the tag is similar in meaning to the one or more keywords.

18. The one or more non-transitory computer readable media of claim 13, wherein an edge that connects an item node to a tag node is weighted based on at least one of a frequency that an associated tag is used to describe an associated item or a frequency that the associated item is included in a plurality of search queries, and wherein propagation of labels by the algorithm is guided by an weight assigned to the edge.

19. A system comprising:
one or more processors; and
memory storing components executable by the one or more processors, the components comprising:
a tag collection component that obtains a set of tags for each of multiple items of a plurality of items, each tag describing an aspect of one or more items;
a graph generation component that generates a partite graph that includes a corresponding item node for each item and a corresponding tag node for each tag cluster of tags, each item node being connected to each of one or more tag nodes by a respective edge; and
a graph evaluation component that executes an algorithm on the partite graph, following assignment of a label to each tag node, in which the partite graph is used to discover a corresponding set of correlated tags for each of one or more tags.

20. The system of claim 19, wherein the graph evaluation component executes the algorithm to obtain a corresponding ranked list of tags for each of the one or more items, and wherein the graph evaluation component stores least one of one or more ranked tags from the ranked list of tags for each of the one or more items or one or more correlated tags from the set of correlated tags for each of the one or more tags as association data, further comprising a recommendation component that provides a browse recommendation of one or more recommended items or a search component that provides a search result that includes one or more result items based on the association data.

21. The system of claim 19, further comprising a tag cluster component that:

performs statistic analysis that determines an association strength between each unique pair of tags of a plurality of tags;
assigns a weighted edge to each unique pair of tags that reflect a corresponding association strength; and
clusters tags in the plurality of tags into tag clusters based at least on the weighted edges.

22. The system of claim 19, further comprising a weight assignment component that assigns weights to edges that connect item nodes to tag nodes based on frequencies at which the items are described by the tags, wherein propagation of labels by the algorithm is guided by the weights assigned to the edges.

23. The system of claim 22, wherein the weights assigned to the edges by the weight assignment component are directly proportional or indirectly proportional to the frequencies at which the items are described by the tags.

24. The system of claim 22, wherein the weight assignment component assigns a first weight to a first edge when a first frequency at which a first item is described by a first tag is within a middle range of frequency values that is higher than a first frequency threshold value and lower than a second frequency threshold value, and assigns a second weight to a second edge when a second frequency at which a second item is described by a second tag is outside of the middle range of frequency values.

25. The system of claim 19, wherein the graph evaluation component, following assignment of a label to each item node, further executes the algorithm on the graph to discover a set of correlated items for each of the one or more items or an item classification of each of the one or more items, and wherein a correlated item of a particular item shares at least one trait with the particular item.

26. The system of claim 19, wherein each of the item nodes in the graph is further connected to one or more entity nodes, and the graph evaluation component further executes the algorithm to obtain a ranked list of tags for each of the one or more entities, further comprising a recommendation component that provides a personalized recommendation of one or more items to an entity based on a particular ranked list of tags for the entity.

* * * * *